United States Patent
Mason (10) Patent No.: US 9,473,480 B2
(45) Date of Patent: Oct. 18, 2016

(54) CONTROLLED ACCESS (71) Applicant: BRITISH TELECOMMUNICATIONS public limited company, London (GB)

(72) Inventor: Jeremy Roger Mason, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 279 days.

(21) Appl. No.: 14/347,809

(22) PCT Filed: Sep. 25, 2012

(86) PCT No.: PCT/GB2012/000741
§ 371 (c)(1),
(2) Date: Mar. 27, 2014

(87) PCT Pub. No.: WO2013/045873
PCT Pub. Date: Apr. 4, 2013

(65) Prior Publication Data
US 2014/0282919 A1 Sep. 18, 2014

(30) Foreign Application Priority Data
Sep. 30, 2011 (EP) .................................... 11250831

(51) Int. Cl.
*H04L 29/06* (2006.01)
*H04L 29/08* (2006.01)

(52) U.S. Cl.
CPC ............. *H04L 63/08* (2013.01); *H04L 63/083* (2013.01); *H04L 63/0807* (2013.01); *H04L 63/0884* (2013.01); *H04L 63/10* (2013.01);
(Continued)

(58) Field of Classification Search
CPC ... H04L 63/08; H04L 67/02; H04L 63/0807; H04L 63/0884; H04L 63/10; H04L 63/083; H04L 63/0281; H04L 63/168
See application file for complete search history.

(56) References Cited

U.S. PATENT DOCUMENTS

| 6,339,423 B1 * | 1/2002 | Sampson | G05B 19/0425 709/219 |
| 8,387,155 B2 * | 2/2013 | Gregg | G06F 21/335 726/29 |
| 8,949,953 B1 * | 2/2015 | Khitrenovich | H04L 63/08 726/2 |

(Continued)

OTHER PUBLICATIONS

Leung et al., "Breaking the Silos—Access and Service Convergence over the Mobile Internet", Oct. 2008, ACM, pp. 286-293.*
Burt et al., "Model Driven Security: Unification of Authorization Models for Fine-Grain Access Control", 2003, IEEE, pp. 1-13.*
Hidehito Gomi, "Dynamic Identity Delegation Using Access Tokens in Federated Environments", 2011, IEEE, pp. 612-619.*

(Continued)

*Primary Examiner* — Matthew Smithers
(74) *Attorney, Agent, or Firm* — Nixon & Vanderhye P.C.

(57) ABSTRACT

User access to a protected resource is controlled by: intercepting a request from a client browser (80) directed to a server (50); requesting user credentials from the client browser (80); processing user credentials received from the client browser (80) to authenticate the user (20); redirecting the client browser (80) to an authorization server (70) configured to issue a token credential; intercepting an authorization request from the browser (80) to the authorization server (70), and inserting into the authorization request an HTTP header variable indicating the authentication status of the user (20). The authorization server (70) is arranged to issue a token credential, which may be used by the user (20) to obtain a token for indicating to a server (50) hosting the protected resource authorization of the user (20) to access the protected resource.

12 Claims, 5 Drawing Sheets (52) U.S. Cl.
CPC .......... *H04L 67/02* (2013.01); *H04L 63/0281* (2013.01); *H04L 63/168* (2013.01)

(56) References Cited

U.S. PATENT DOCUMENTS

| | | | | |
|---|---|---|---|---|
| 2003/0005118 | A1* | 1/2003 | Williams | H04L 63/08 709/225 |
| 2004/0128393 | A1* | 7/2004 | Blakley, III | H04L 63/0807 709/229 |
| 2006/0021004 | A1* | 1/2006 | Moran | H04L 63/08 726/2 |
| 2007/0136603 | A1* | 6/2007 | Kuecuekyan | G06F 21/6218 713/185 |
| 2008/0263638 | A1* | 10/2008 | McMurtry | G06F 21/335 726/4 |
| 2008/0263652 | A1* | 10/2008 | McMurtry | G06F 21/335 726/9 |
| 2011/0126296 | A1* | 5/2011 | Moore | H04L 63/0807 726/28 |
| 2011/0209210 | A1* | 8/2011 | Miller | G06F 21/41 726/8 |
| 2011/0287739 | A1* | 11/2011 | Cajigas Bringas | H04L 63/18 455/410 |
| 2013/0007846 | A1* | 1/2013 | Murakami | H04W 12/08 726/4 |
| 2014/0040993 | A1* | 2/2014 | Lorenzo | G06F 21/41 726/4 |

OTHER PUBLICATIONS

Zhang, A.M. et al., "xDAuth: a scalable and lightweight framework for cross domain access control and delegation", Proceedings of the 16th ACM Symposium on Access Control Models and Technologies 2011, (Jun. 17, 2011), pp. 31-40.

Mortimore, C. et al., "OAuth 2.0 Assertion Profile: draft-ietf-oauth-assertions-00.txt", Oauth 2.0 Assertion Profile; draft-ietf-oauth-assertions-00.txt Internet Engineering Task Force, (Jul. 4, 2011), pp. 1-14.

Hammer-Lahav, E. et al., "The OAuth 2.0 Authorization Protocol; draft-ietf-oauth-v2-21.txt", The Oauth 2.0 Authorization Protocol; draft-ietf-oauth-V2-21.txt, Internet Engineering Taskforce, No. 21, (Sep. 5, 2011), pp. 1-64.

International Search Report dated Nov. 23, 2012 issued in International Application No. PCT/GB2012/000741.

Alam M.; Zhang X.; Khan K. H.; Ali G: "xDAuth: a scalable and lightweight framework for cross domain access control and delegation", Proceedings of the 16th ACM Symposium on Access Control Models and Technologies 2011, Jun. 17, 2011, pp. 31-40, XP002667798 (10 pgs.).

Mortimore C. et al: "OAuth 2.0 Assertion Profile; draft-ietf-oauth-assertions-00.txt" Internet Engineering Task Force, IETF; Standardworkingdraft, Internet Society (ISOC) 4, Rue des Falaises, Geneva, Switzerland, Jul. 4, 2011, pp. 1-1, XP015076865 (15 pgs.).

Hammer-Lahav E et al: "The OAuth 2.0 Authorization Protocol; draft-ietf-oauth-v2-21.text", Internet Engineering Task Force, IETF; Standardworkingdraft, Internet Society (ISOC) 4, Rue des Falaises, Geneva, Switzerland, No. 21, Sep. 5, 2011, pp. 1-64, XP015077907 (65 pgs.).

* cited by examiner

CONTROLLED ACCESS

This application is the U.S. national phase of International Application No. PCT/GB2012/000741, filed 25 Sep. 2012, which designated the U.S. and claims priority to EP Application No. 11250831.2, filed 30 Sep. 2011, the entire contents of each of which are hereby incorporated by reference.

BACKGROUND AND SUMMARY

The invention relates to controlling access by a client acting on behalf of a user to a protected resource hosted on a server.

Current token-based access control systems have advantages but lack a capability for single website login for multiple sites with central control of operation. There is a need to allow a user to access protected resources across a network by means of a mobile application, however, the application may not be trusted with user credentials. There is a need for an improved and more secure system for granting controlled access to protected resources. The invention addresses at least some of the above problems.

A method is proposed for controlling user access to a protected resource, in which the method comprises: intercepting a request from a client browser directed to a server; requesting user credentials from the client browser; processing user credentials received from the client browser to authenticate the user; redirecting the client browser to a server configured to issue a token credential for indicating to a server configured to issue such a token, authorization of the user to obtain a token for indicating to a server hosting the protected resource authorization of the user to access the protected resource; intercepting an authorization request from the browser to the server configured to issue a token credential, and inserting into the authorization request an HTTP header variable indicating the authentication status of the user.

The method may further comprise receiving in response to the authorization request, a token credential and sending the received token credential to the browser.

A further method is proposed for controlling user access to a protected resource, in which the method comprises: intercepting a request from a client application directed to a server; obtaining user credentials; processing the user credentials to authenticate the user and sending to a server configured to issue a token for indicating to a server hosting the protected resource, authorization of the user to access the protected resource, a HTTP request comprising at least one HTTP header variable indicating authentication of the user; in which the user credentials are not present in the HTTP request.

The further method of may further comprise receiving in response to the HTTP request, a token and sending the received token to the client application.

BRIEF DESCRIPTION OF THE DRAWINGS

In order to aid understanding, embodiments of the invention will now be described by way of example with reference to the drawings in which.

DETAILED DESCRIPTION OF EMBODIMENTS OF THE INVENTION

The invention relates to controlling access by a client acting on behalf of a user to a protected resource.

According to the invention, authentication is provided by a centralised cookie-based access control method, such as Computer Associates SiteMinder and authorization is handled separately in a token-based method, such as oAuth, resulting in issue of a token granting access to the protected resource. The cookie-based access control method and the token based access control systems are designed to work independently, with each being based on a different client interface. The present invention combines aspects of each access control method to provide an improved and more secure system for granting controlled access to protected resources to users who are connecting to a server hosting the resource by means of an application rather than using a browser.

We now describe embodiments of the invention.

Figure 1A:
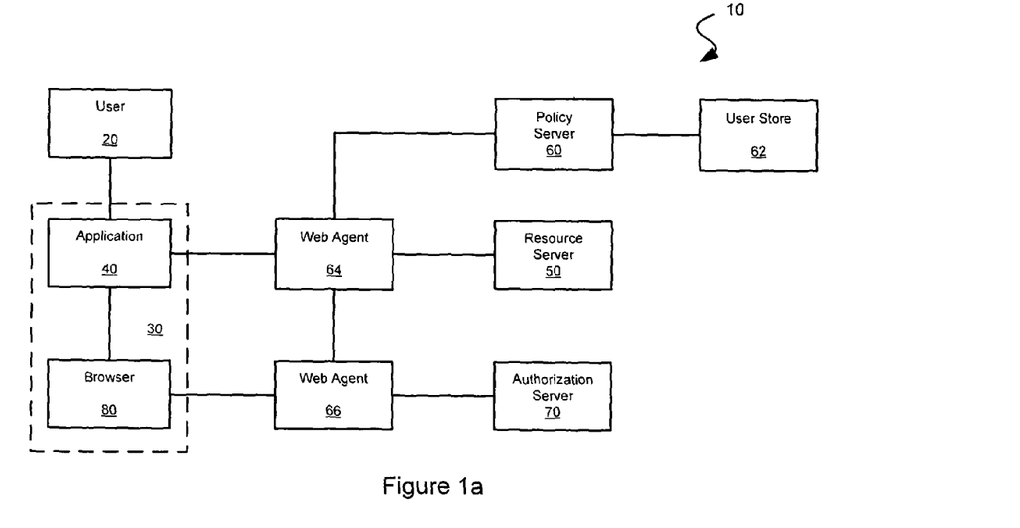
FIGS. 1a and 1b shows schematics of networks according to aspects of the present invention.

FIG. 1a shows the main components of a network 10 for implementing the present invention according to a first embodiment. User 20, who will normally be the resource owner, communicates with the various servers in the network via client 30. Client 30 may be any suitable networked user device running an application 40 for handling communication with the rest of network 10 on behalf of the user 20. In particular, client 30 may be a mobile device such as a personal digital assistant (PDA), mobile phone or tablet device and application 40 may be a mobile application designed to run under a mobile operating system (such as iOS, Android, BlackBerry, Symbian, Windows Phone, etc), in the environment provided by a mobile device: typically low storage and processing capabilities, low-power and a restricted user interface.

The user 20 will mainly be interested in communication with resource server 50. Resource server 50 hosts content that the user wants to access from client 30. At least some of the content hosted on resource server 50 will be protected, i.e. access to this content is controlled to restrict access to authorized users. In order to access protected content, user 20 must be authenticated by the network to establish their identity. User 20 must also be authorized by the network to establish what content the authenticated identity associated with the user is allowed to access. As will become apparent from the detailed description, below, client 30 may also run browser 80 in addition to application 40 as an alternative means of communicating with network 10.

Centralised, cookie-based authentication and authorization for network 10 is implemented by policy server 60, policy store 62 and web agents 64, 66 in combination with token-based access control implemented by authorization server 70 and resource server 50. The provision of access to protected resources hosted on resource server 50 and the authentication and authorization used to control access according to various aspects of the invention will now be described in detail.

Figure 2A:
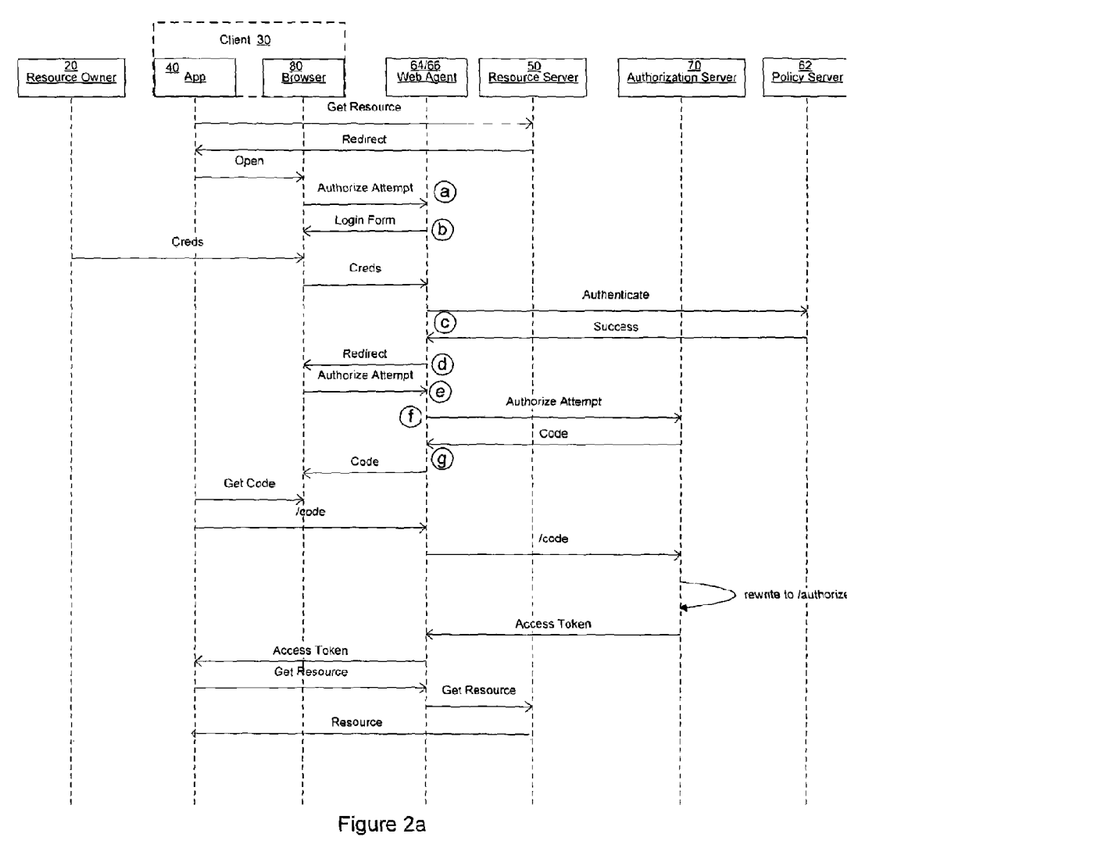
FIGS. 2a, 2b and 4 show diagrams of message flows according to an aspect of the present invention.

FIG. 2a shows messages exchanged between the elements of network 10 according to a first embodiment of the invention. According to the first embodiment, application 40 is not trusted with the user credentials. As shown in FIG. 2, when user 20 wants to access a resource hosted by resource server 50, whether data, photographs, music or some other stored content, user 20 initiates an access request by interacting with application 40 running on client 30. Application 40 is designed to handle such requests and sends an access request message (Get Resource) to resource server 50 hosting the requested resource. As already mentioned, network 10 implements centralised, cookie-based authentication and authorization and web agent 64 (e.g. a SiteMinder web agent) which may be embedded on resource server 50, intercepts the access request from application 40. Web agent 64 determines that the access request does not require authentication and authorization and passes the Get Resource request to resource server 50. Resource server 50 inspects the received access request and identifies that it lacks an indication that the user is authorized to access the resource. Resource server 50 therefore issues a redirect command (Redirect) back to application 40. On receipt of the redirect command, client 30 opens (Open) browser 80 and sends an authorization request to authorization server 70. As with the original, access request, the authorization request from browser 80 is intercepted (a) by web agent 66. This actually could be the same as web agent 64, depending on implementation details. Alternatively, web agent 66 may be embedded on authorization server 70.

Figure 3:
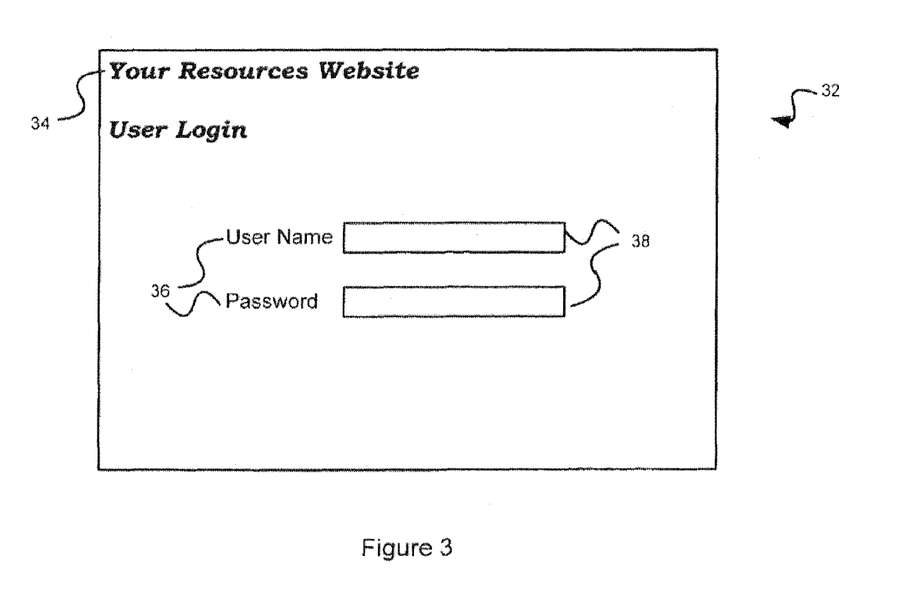
FIG. 3 shows a user prompt according to an aspect of the present invention.

Web agent 66 is designed to handle authorization requests and prompts the user by sending (b) a login form to browser 80. A suitable form is shown at 32 in FIG. 3, identifying 34 the web site that provides access to the desired resources and providing prompts 36 and text boxes 38 for the user to type their credentials. In response to display on client 30 of login form 32 by browser 80, user 20 enters in boxes 38, their credentials—typically a username specific to the user and a password, which are forwarded by browser 80 to web agent 66. Web agent 66, copies (c) the credentials to policy server 60. Policy server 60 may check with user store 62, which may be embodied as a LDAP server (not shown) for policies and rules appropriate to the current user and the access request.

Policy server 60 checks the user's credentials against the relevant policy and rules and (in the case where the credentials are accepted) returns a Success message to web agent 66. On receipt of the Success message, web agent 66 issues (d) a redirect command to browser 80, causing browser 80 to resend (e) the authorization request directed to authorization server 70. This time the authorization request is passed (f) by web agent 66 to authorization server 70. Authorization server 70 checks the message header of the request and accepts the request as valid and authorised on the basis of HTTP Header Variables provided by policy server 60 (e.g SMUSER containing username). On determining that the token request is valid and authorised, authorization server 70 sends via web agent 66 (g) a token credential (i.e. a code entitling the user to an access token granting access to the protected resource) to browser 80, which transfers the code to application 40. For example, application 40 can interrogate (Get Code) the contents of the browser page using a browser API.

The user name and password are sensitive information that needs to be kept secret. The above method enables authorization to be achieved without sharing the user credentials with application 40.

Application 40 sends to authorization server 70 a request (Code) for an access token for access to the protected resource. The request now comprises the token credential. As before, this request is intercepted by web agent 66. Were the request to be a standard "authorize" type of request, the web agent would seek to authenticate and authorize the user, even though such an operation would be redundant given the authentication and authorization process that has already been completed. According to one aspect of the invention, the token request is characterized as a non-standard type of request which is not recognized by web agent 64 (e.g. a "code" request, which may have a header of the form: http://api.acme.com/oauth/code). On receiving the non-standard request, web agent 66 does not recognize it as requiring checking and passes it to authorization server 70. An alternative embodiment is described, below, in which the token request is a standard "authorize" type.

Authorization server 70 receives the token request but, where it is of type "code", authorization server 70 will not recognize it as a valid token request. According to a further aspect, authorization server 70 locates the code contained in the token request and, where the code is found to be valid, converts the request to a conventional "authorize" type of request (which may, for example, take the form http://api.bt.com/oauth/authorize). When authorization server 70 recognizes the received token request as valid (i.e. it verifies the token credential included in what is now a request of type "authorize"), the authorization server issues an access token in a reply message. The reply message is forwarded by web agent 66 to application 40. Application 40 now generates a new Get Resources request (comprising the token issued by authorization server 70) for access to the protected resource and sends it to resource server 50. This request is intercepted by web agent 64, which does not recognize it as requiring checking and so passes it to resource server 50. Upon receiving the access request with a valid token, resource server 50 sends the requested resource to application 40, so making it available to user 20.

Figure 2B:
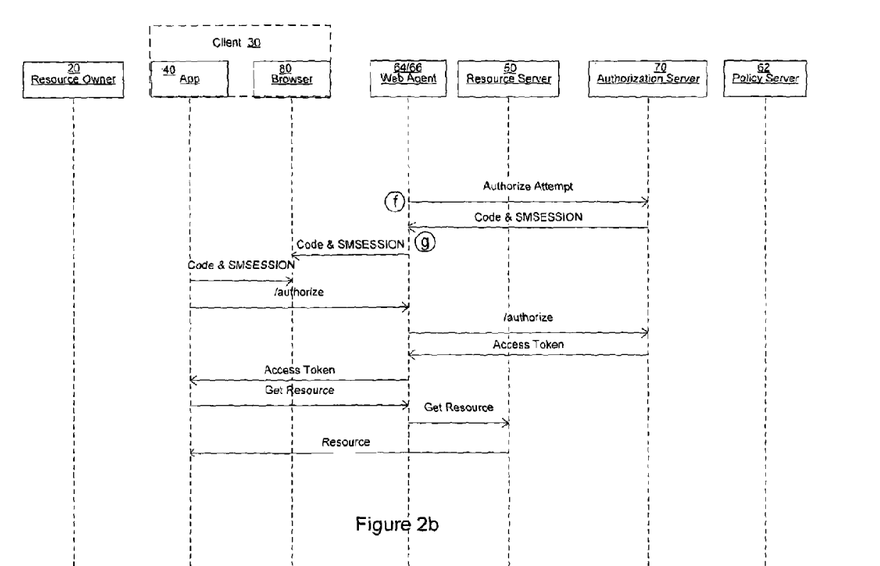

FIG. 2*b* shows an alternative message exchange between the elements of network 10 according to a second embodiment of the invention. FIG. 2*a* does not show the complete message flow but omits messages exchanged from the start of the access process up to (f) Authorize Attempt, as all these earlier exchanges are common to both the first and second embodiments.

According to the second embodiment, the token request used is a standard "authorize" type of request (e.g. a request which may take a header of the form: http://api.bt.com/oauth/authorize) to which are added variables provided by web agent 66 on receipt of the Success message from policy server 60 (for example, Siteminder SMSESSION cookie). On receipt of a standard "authorize" type of request by web agent 64, the session variables added from policy server 60 are accepted as indicating that the user has been authenticated and authorized as regards the request and so web agent 64 passes the token request to authorization server 70. Advantageously this second embodiment enables the receipt by the authorization server of a request of standard "authorize" type, which the authorization server recognises and is able to process. There is, as a result, no need to convert the type of request before processing by authorization server 70.

Figure 1B:
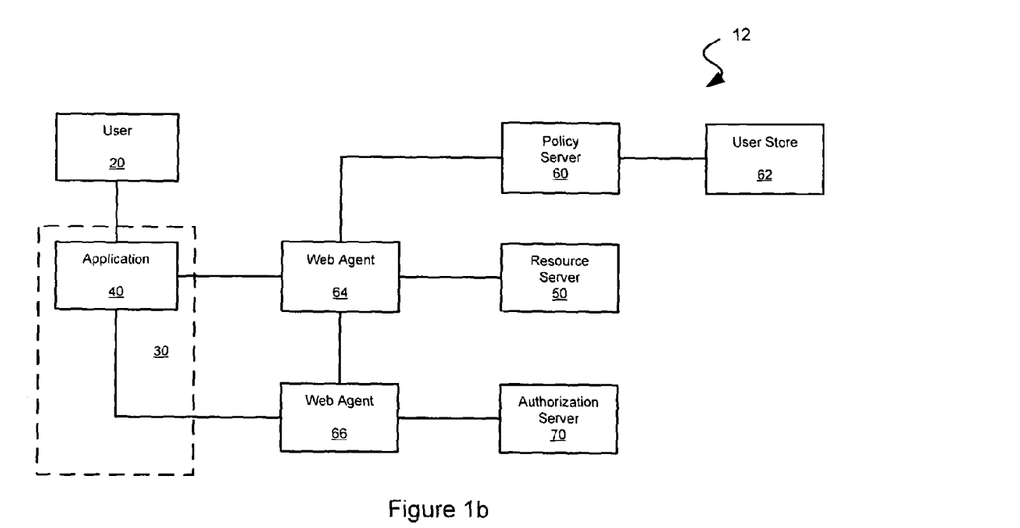

FIG. 1*b* shows the main components of a network 12 for implementing the present invention according to a second embodiment. Elements common to both FIGS. 1*a* and 1*b* share the same label and will not be further described here. Whereas, in network 10 of FIG. 1*a*, client 30 has a browser 80, no browser is required on client. 30 of FIG. 2. Instead of communicating with authorization server 70 (via web agent 66) from a browser, client 30 of FIG. 1*b* communicates with authorization server 70 (again via web agent 66) directly from application 40.

Figure 4:
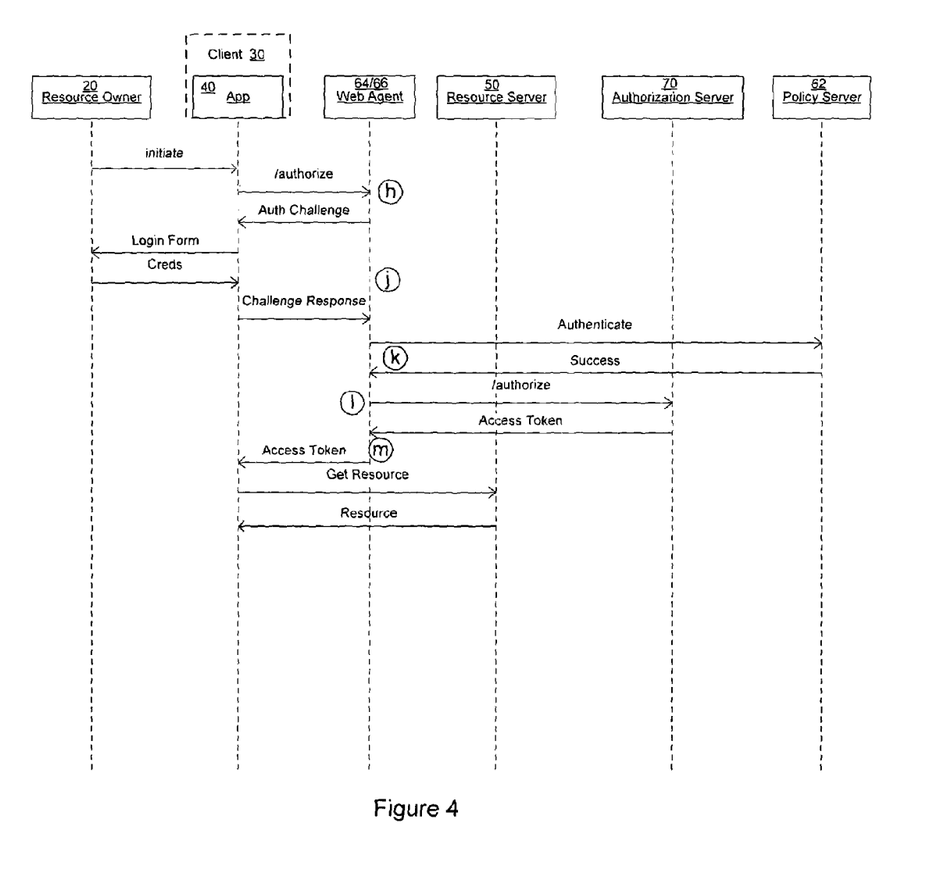

FIG. 4 shows messages exchanged between the elements of network 12 according to a third aspect of the invention. Unlike the first two embodiments of FIGS. 2*a* and 2*b*, according to the third embodiment, application 40 is trusted with the user credentials. There is no need for client 30 to run browser 80. As shown in FIG. 4, when user 20 wants to access a resource, user 20 initiates an access request by interacting with application 40 running on client 30. Application 40 is designed to handle such requests and sends an access request message of type "authorize" (which may, for example, take the form http://api.bt.com/oauth/authorize) to resource server 50 hosting the requested resource. Web agent 64 (e.g. a SiteMinder web agent) which may be embedded on resource server 50, intercepts (h) the access request from application 40. Web agent 64 recognizes the "authorize" type of request and determines that the access request requires authentication and authorization. Web agent 64 issues (j) an authorization challenge back to application 40. On receipt of the challenge, application 40 prompts the user by displaying login form 32 to user 20. In response to display on client 30 of the login form, user 20 enters their credentials, typically a username specific to the user and a password, which are forwarded by application 40 to web agent 64. Web agent 64, copies (k) the credentials to policy server 60. Policy server 60 may check with user store 62 (which may be embodied as a LDAP server—not shown) for policies and rules appropriate to the current user and the access request.

Policy server 60 checks the user's credentials against the relevant policy and rules and (in the case where the credentials are accepted) returns a Success message to web agent 64. On receipt of the success message, web agent 66 now forwards (l) to authorization server 70 the access request message of type "authorize", originally received from application 40, to which is added variables (for example, Siteminder SMSESSION cookie) provided by web agent 64 on receipt of the success message from policy server 60. Authorization server 70 verifies that the access request message is valid with reference to the variables inserted by web agent 64 and, according to a further aspect of the invention may additionally check other variables provided in the original request by application 40. When satisfied that the access request is correct, authorization server 70 then issues an access token. The access token is forwarded (m) by web agent 66 to application 40. Application 40 now generates a new Get Resource request (comprising the token issued by authorization server 70) for access to the protected resource and sends it to resource server 50. This request is intercepted by web agent 64, which does not recognize it as requiring checking and so passes it to resource server 50. Upon receiving the access request with a valid token, resource server 50 sends the requested resource to application 40, so making it available to user 20.

Figure 5:
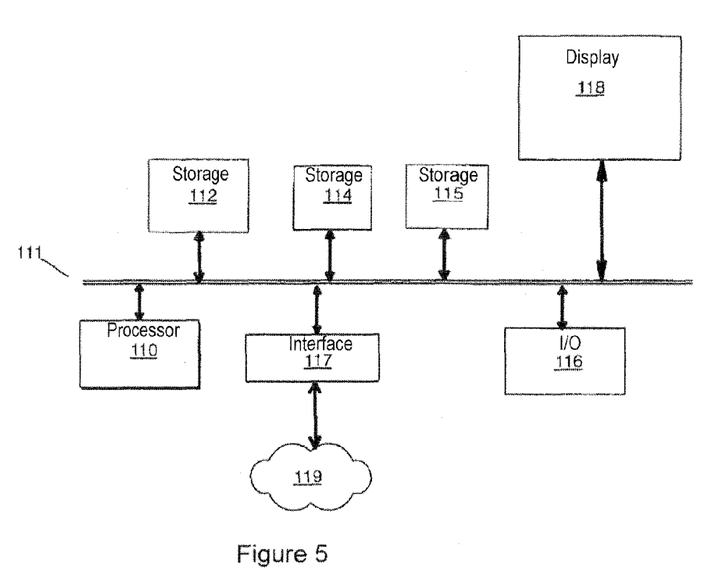
FIG. 5 shows a schematic of a server or client suitable for implementation of the present invention.

A typical architecture for a server, client or other form of computer apparatus on which software implementing the invention can be run, is shown in FIG. 5. Each computer apparatus comprises a processor 110 for executing computer program instructions and managing and controlling the operation of the computer apparatus. Processor 110 is connected to via a bus 111 to a variety of devices including solid-state memory devices including non-volatile storage 114 and volatile storage 115. Further non-volatile storage 112 may comprise one or more magnetic or optical disc drives and may comprise removable, non-volatile storage means such as removable magnetic or optical media (for example re-writable or recordable DVDs) or non-volatile memory cards.

The computer apparatus further includes one or more network interfaces 117 for interfacing to and exchanging data via one or more networks 119 such as an IP network underpinning the various connections shown in FIG. 1. The network interface(s) may be a local area network (LAN) adaptor connecting to a LAN. The LAN may itself be connected to other LANs and wide area networks (WANs) to enable the apparatus to communicate with and exchange data with other computer apparatuses. Alternatively, the network interface may be a DSL modem, or similar, that provides a connection to a WAN, such as the internet or an intranet, which enables communications with further networks. In the case of the client, network interfaces 117 will include a wireless interface according to one or more of GSM, GPRS, Wi-Fi, WiMax, etc.

The computer apparatus can also, optionally, include user input/output devices such as a pointer device/keyboard 116 as well as a visual display 118. The computer apparatus is powered by power supply unit (not shown), typically obtaining power from an external power grid or internal battery (not shown). The skilled person will understand that this architecture is not limiting, but is merely an example of typical computer apparatus architecture. The computer apparatus may also be a distributed system, comprising a number of computer apparatuses communicating through respective interface ports 117 such that a user may access program and other data stored on a remote computer apparatus.

Non-volatile data storage means 112, 114 comprises an operating system and one or more application programs. The operating system comprises the software that the computing apparatus requires to operate, communicate with other computer apparatuses, receive input from users, display outputs and results to users, etc. Non volatile data storage means 112, 114 may comprise applications and other computer code which can be executed in order to perform a method according to the present invention, for example such as the one described above and illustrated in the drawings. It will be understood that computer code may comprise a single integrated application or a number of different modules that are accessed separately to execute a method according to the present invention. Each module may perform the functionality of one or more of the processes, which comprise the present invention.

The above embodiments are to be understood as illustrative examples of the invention. Further embodiments of the invention are envisaged and will be evident to the skilled reader. It is to be understood that any feature described in relation to any one embodiment may be used alone, or in combination with other features described, and may also be used in combination with one or more features of another of the embodiments, or any combination of the embodiments. Furthermore, equivalents and modifications not described above will be evident to the skilled reader and may also be employed without departing from the scope of the invention, which is defined in the accompanying claims.

As will be understood by those skilled in the art, the invention may be implemented in computer program product software, any or all of which may be contained on various storage media so that the program can be loaded onto one or more general purpose computers or downloaded over a computer network using a suitable transmission medium. The computer program product used to implement the invention may be embodied on any suitable carrier, readable by a suitable computer input device, such as optically readable media and magnetic media.

The invention claimed is:

1. A method for controlling user access to a protected resource, in which the method comprises:
   receiving, from an untrusted application, an access request for a user to a protected resource at a resource server;
   determining whether the access request lacks an indicating that the user is authorized to access the protected resource;
   sending, upon determination that the access request lacks the indication that the user is authorized to access the protected resource, a command, from the resource server to the application, for opening a client browser;
   intercepting a request from the client browser directed to an authorization server;
   requesting user credentials from the client browser;
   processing user credentials received from the client browser to authenticate the user;
   redirecting the client browser to the authorization server configured to issue a token credential for indicating authorization of the user to obtain a token for indicating to the resource server authorization of the user to access the protected resource;
   intercepting an authorization request from the browser to the authorization server configured to issue a token credential, and
   inserting into the authorization request an HTTP header variable indicating the authentication status of the user;
   wherein the token credential allows access, by the application, to the token from the authorization server.

2. The method of claim 1 further comprising:
   in response to the authorization request, sending the token credential to the browser.

3. The method of claim 1 further comprising:
   sending to the authorization server authorization of the user to access the protected resource, a HTTP request comprising at least one HTTP header variable indicating authentication of the user; in which the user credentials are not present in the HTTP request.

4. The method of claim 3 further comprising:
   in response to the HTTP request, sending a token to the application.

5. The method of claim 1, in which the at least one HTTP header variable is generated as part of a session between the browser running on a client and a web agent.

6. The method of claim 1 further comprising
   receiving, at the authorization server, a request message comprising a URI that is not recognized by the authorization server as indicating a request for authorization to access a protected resource; in which the path name is replaced on the authorization server with a path name of a type that is recognized by the authorization server as indicating a request for authorization to access a protected resource.

7. The method of claim 1 further comprising:
   sending the token credential to the browser running on a client for sharing the token credential with the application running on the client.

8. The method of claim 7 further comprising:
   receiving, from the application running on the client, the token credential to obtain the token for indicating to the resource server hosting the protected resource, authorization of the user to access the protected resource.

9. A non-transitory tangible computer readable medium having stored thereon, computer executable instructions that, if executed by a computing device, cause the computing device to perform a method comprising:
   receiving, from an untrusted application, an access request for a user to a protected resource at a resource server;
   determining whether the access request lacks an indication that the user is authorized to access the protected resource;
   sending, upon determination that the access request lacks the indication that the user is authorized to access the protected resource, a command, from the resource server to the application, for opening a client browser;
   intercepting a request from the client browser directed to an authorization server;
   requesting user credentials from the client browser;
   processing user credentials received from the client browser to authenticate the user;
   redirecting the client browser to the authorization server configured to issue a token credential for indicating authorization of the user to obtain a token for indicating to the resource;
   intercepting an authorization request from the browser to the authorization server configured to issue a token credential, and
   inserting into the authorization request an HTTP header variable indicating the authentication status of the user;
   wherein the token credential allows access, by the application, to the token from the authorization server.

10. The non-transitory tangible computer readable medium of claim 9, the method further comprising sending the token credential to the browser in response to the authorization request.

11. A computer server system for controlling user access to a protected resource, the computer server system comprising a resource server and an authorization server, and the computer server system being at least configured to:
   receive, from an untrusted application, an access request for a user to a protected resource at the resource server;
   determine whether the access request lacks an indication that the user is authorized to access the protected resource;
   send, upon determination that the access request lacks the indication that the user is authorized to access the protected resource, a command, from the resource server to the application, to open a client browser;
   intercept a request from the client browser directed to the authorization server;
   request user credentials from the client browser;
   process user credentials received from the client browser to authenticate the user;
   redirect the client browser to the authorization server configured to issue a token credential for indicating authorization of the user to obtain a token for indicating to the resource server authorization of the user to access the protected resource;
   intercept an authorization request from the browser to the authorization server configured to issue a token credential; and
   insert into the authorization request an HTTP header variable indicating the authentication status of the user;
   wherein the token credential allows access, by the application, to the token from the authorization server.

12. The computer server system of claim 11, wherein the computer server system is further configured to send the token credential to the browser in response to the authorization request.

* * * * *